Feb. 23, 1926.  1,574,696
C. A. ROBERTS
BED
Filed Jan. 18, 1924      3 Sheets-Sheet 1
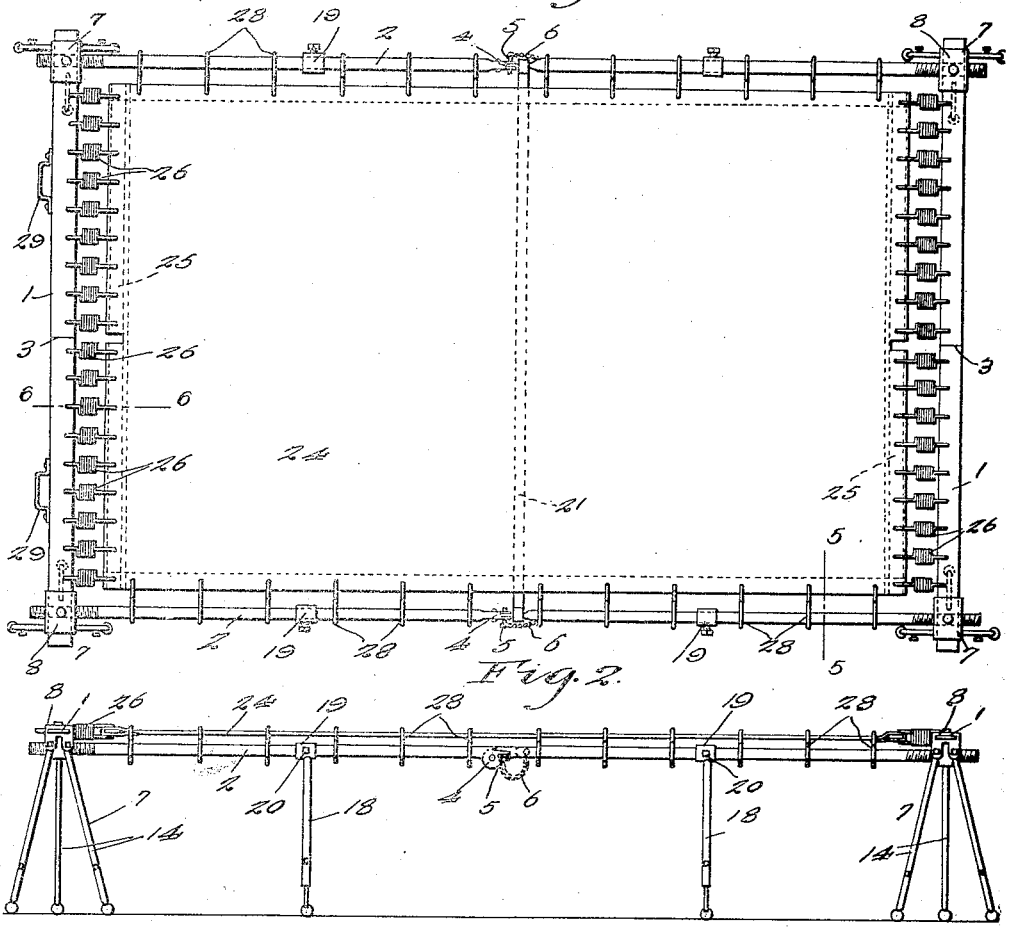
Fig. 1.
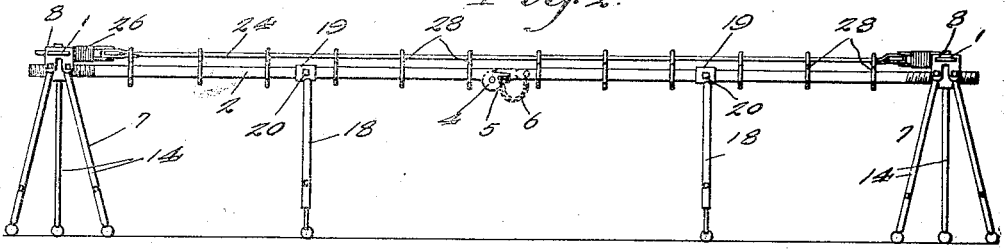
Fig. 2.
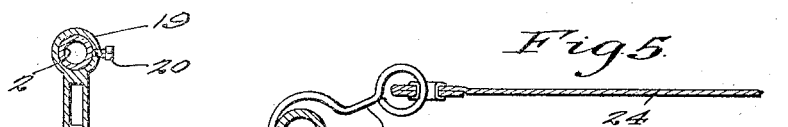
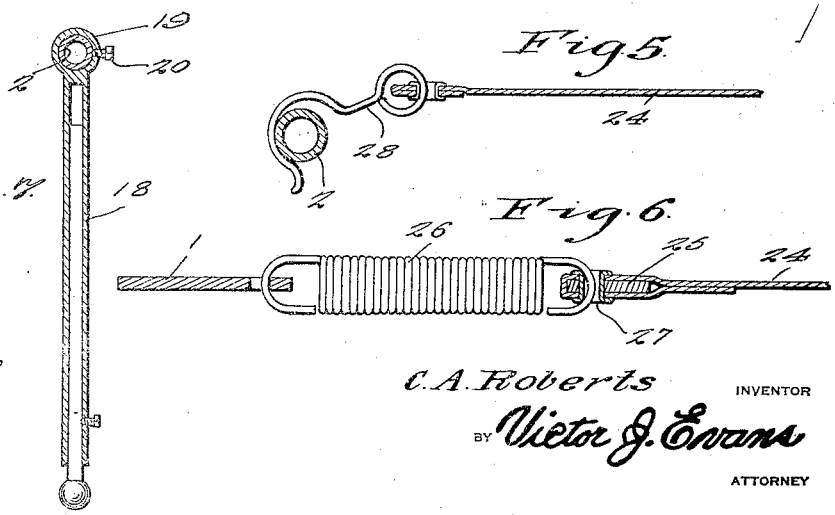
C. A. Roberts INVENTOR
BY Victor J. Evans ATTORNEY Feb. 23, 1926.  
C. A. ROBERTS  
BED  
Filed Jan. 18, 1924   3 Sheets-Sheet 2
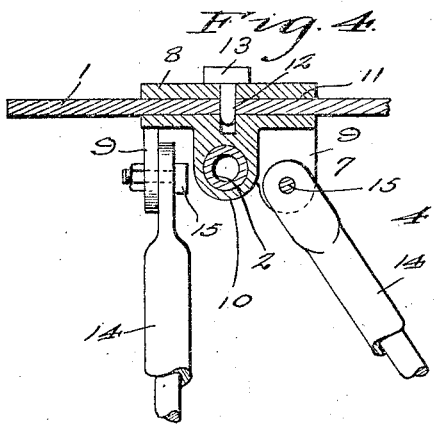
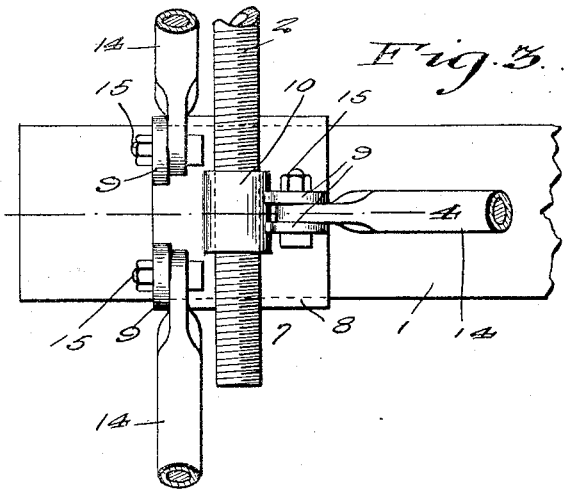
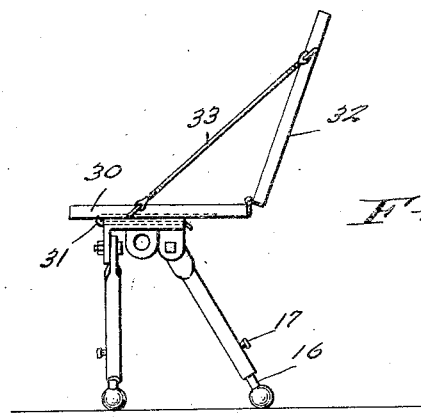
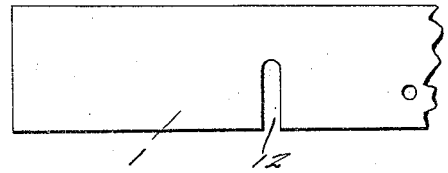
C. A. Roberts INVENTOR
BY Victor J. Evans ATTORNEY Feb. 23, 1926.
C. A. ROBERTS
BED
Filed Jan. 18, 1924
1,574,696
3 Sheets-Sheet 3
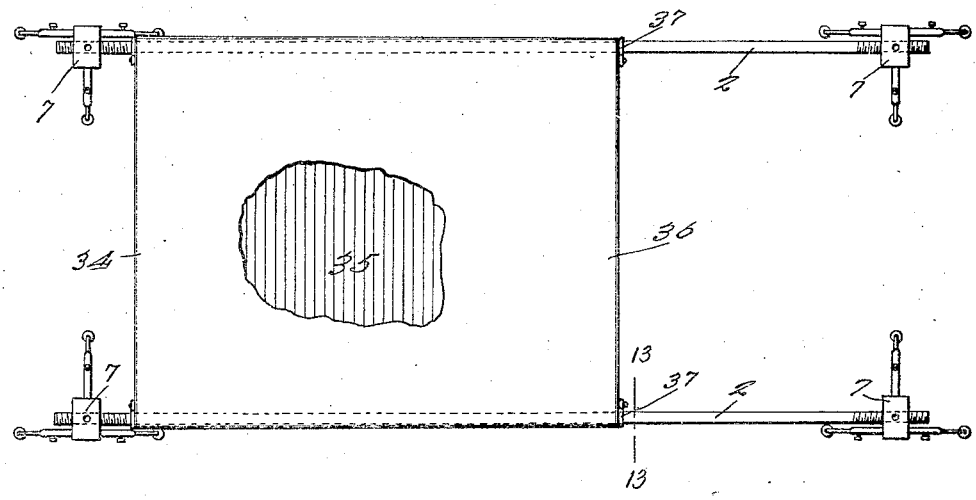
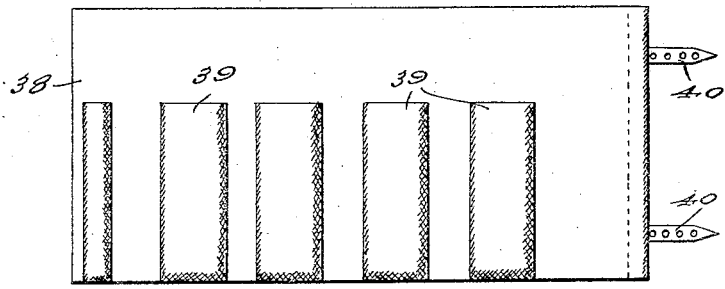
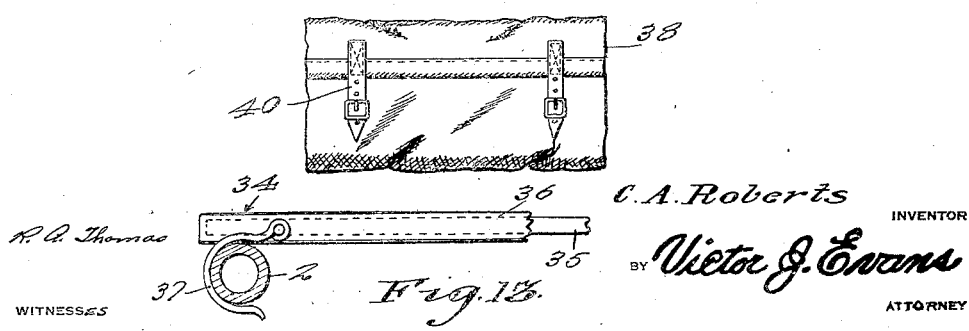

Patented Feb. 23, 1926.

1,574,696

UNITED STATES PATENT OFFICE.

CHARLES A. ROBERTS, OF BUTTE, MONTANA.

BED.

Application filed January 18, 1924. Serial No. 687,132.

*To all whom it may concern:*

Be it known that I, CHARLES A. ROBERTS, a citizen of the United States, residing at Butte, in the county of Silver Bow and State of Montana, have invented new and useful Improvements in Beds, of which the following is a specification.

This invention relates to a folding camp bed the general object of the invention being to so form the parts of the bed that it may be folded into a compact bundle and thus be easily carried about in an automobile and the like.

Another object of the invention is to provide improved means for holding the canvas sheet in stretched condition on the bed A further object of the invention is to provide means for converting the bed into a table or a stool.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the bed.

Figure 2 is a side view.

Figure 3 is a bottom plan view, with parts in section of one of the tripods and showing portions of the frame connected therewith.

Figure 4 is a section on line 4—4 of Figure 3.

Figure 5 is a section on line 5—5 of Figure 1.

Figure 6 is a section on line 6—6 of Figure 1.

Figure 7 is a sectional view through one of the legs for supporting the sides of the bed.

Figure 8 is a view of one end of one of the end rails.

Figure 9 is an edge view of the central part of said rail.

Figure 10 is a view of the central bracing member.

Figure 11 is a view of a chair.

Figure 12 is a plan view of a table with parts broken away.

Figure 13 is a section on line 13—13 of Figure 12.

Figure 14 is a view of the cover for the parts.

Figure 15 is a view of the cover in folded position and enclosing the parts.

In these views, 1 indicates the end rails of the bed and 2 the side rails thereof. The end rails are each formed of a pair of sections of flat material which are hingedly connected together, as shown at 3, so that the two sections can be folded one upon the other. The side rails 2 are each formed of a pair of sections of rounded material which are connected together by the buggy standard type of hinge 4 which prevents the abutting ends of the sections to be moved downwardly beyond a horizontal position though permitting them to be moved upwardly so that the two sections can be folded together. A pin 5 and a chain 6 prevent this upward movement of the sections when the pin is in place. The corners of the frame formed by the end and side rails are supported by the tripods 7, each of which consists of a flat member or base 8 having the ears 9 and the screw threaded tubular part 10 on its underside and a slot 11 passing through it. This slot receives the ends of the end rails and the tubular part 10 the screw threaded ends of the side rails. The end rails are provided with notches 12 to receive the pins 13 for holding them in the tripods. The ears 9 pivotally support the telescoping legs 14 by means of the bolts 15. The inner part 16 of each leg is held in adjusted position by the set screw 17. The side rails are also supported by the telescopic legs 18 which have tubular parts 19 at their upper ends for receiving portions of the side rails and these tubular parts are clamped to the side rails by the set screws 20. A bracing member 21 is provided for the center of the bed and this member is formed of two sections hinged together at 22 and has its ends bent at right angles and provided with hooks, as shown at 23, the hooks engaging the side rails. By bending the ends of the bracing member the body thereof is spaced from the canvas strip 24 of the bed. This canvas sheet 24 has its ends hemmed to receive the bars 25, two of which are placed in each hem so that the sheet can be folded with the end rails. Coil springs 26 have their ends passing through holes formed in the end rails and through eyelets 27 which connect the ends of the sheet with the bars 25. Hooks 28 are fastened to the side eadges of the sheet and engage the side rails. One of the end rails is provided with handles 29 for facilitating the assembling of the parts.

From the foregoing it will be seen that the sheet is held in stretched condition and it may be stretched by rotating the side bars which have their ends threaded in opposite directions so that when the bars are turned the tripods are moved away from each other and thus the end rails will stretch the sheet. The supporting frame for the sheet is firmly supported by the legs and the bracing strip 21 at the center thereof. The entire device can be easily folded at its longitudinal center and at its transverse center so that it will occupy but little space when not in use. By having the legs of the tripods pivoted to the base thereof, these legs can be folded when the bed is not in use.

The tripods can also be used for supporting a seat and back, as shown in Figure 11, where the seat 30 is detachably connected with the tripod by a spring clip 31 having one part passing through the slot in the base of the tripod. The back 32 is hinged to the seat so it can be folded and the movement of this back is limited by the straps 33 which connect the back with the seat.

I also provide means for using the side rails and the tripods to support a table top, as shown in Figure 12. In this figure the table top is shown at 34 and it consists of a plurality of slats 35 encased by a cover 36 so that the top can be folded into a compact bundle when not in use. Hooks 37 are pivoted to the edges of the top and are arranged to engage the side rails of the bed, as shown in Figure 13.

I also provide a cover 38 for the various parts of the device which is provided with the pockets 39 to receive said parts and then the cover with the parts therein is rolled into a bundle and fastened together by the straps and buckles 40, as shown in Figure 15.

Thus it will be seen that I have provided simple means for quickly and easily forming a bed, a number of chairs or a table with means whereby the various parts can be rolled up in a cover so that they can be carried in an automobile or stored. By having the means for stretching the canvas sheet a comfortable bed is provided as the sheet will not sag under the weight of the user.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A camp bed comprising a rectangular frame consisting of side pieces and end pieces, a support at each corner of the frame, each support being of tripod form and consisting of a base to which three legs are each pivoted, said base having means by which it is connected to the adjacent free end of an end piece and other means by which it is connected to the adjacent free end of a side piece.

2. A device of the class described comprising a rectangular frame consisting of side and end parts, a tripod at each corner of the frame having foldable legs, each tripod having a threaded hole therein for receiving a threaded end of the side parts of the frame, and means for detachably connecting the end parts of the frame with the tripods.

3. A camp bed comprising a rectangular frame consisting of a pair of end rails and a pair of sectional foldable side rails, supporting tripods at each corner of the frame detachably connected to ends of adjacent side rails and adjacent end rails, and a telescopic leg adjustably connected to each section of the side rails.

4. A tripod having a slot in its base adapted to receive and support the end of the side rail of a cot, a seat having a projection thereon for engaging the slot and a back hinged to the seat.

5. A device of the class described comprising a frame, tripods detachably connected with the ends of the frame, a table top, means for detachably connecting the same with the side rails of the frame to form a table, a chair seat, and means for detachably connecting the same with one of the tripods to form a chair.

In testimony whereof I affix my signature.

CHARLES A. ROBERTS.